Jan. 26, 1971   T. A. ROSE   3,558,255
CONTROL SYSTEM FOR WASTE WATER TREATMENT PLANTS
Filed Jan. 26, 1970   2 Sheets-Sheet 1

INVENTOR.
THOMAS A. ROSE
BY
*James R. Campbell*
ATTORNEY

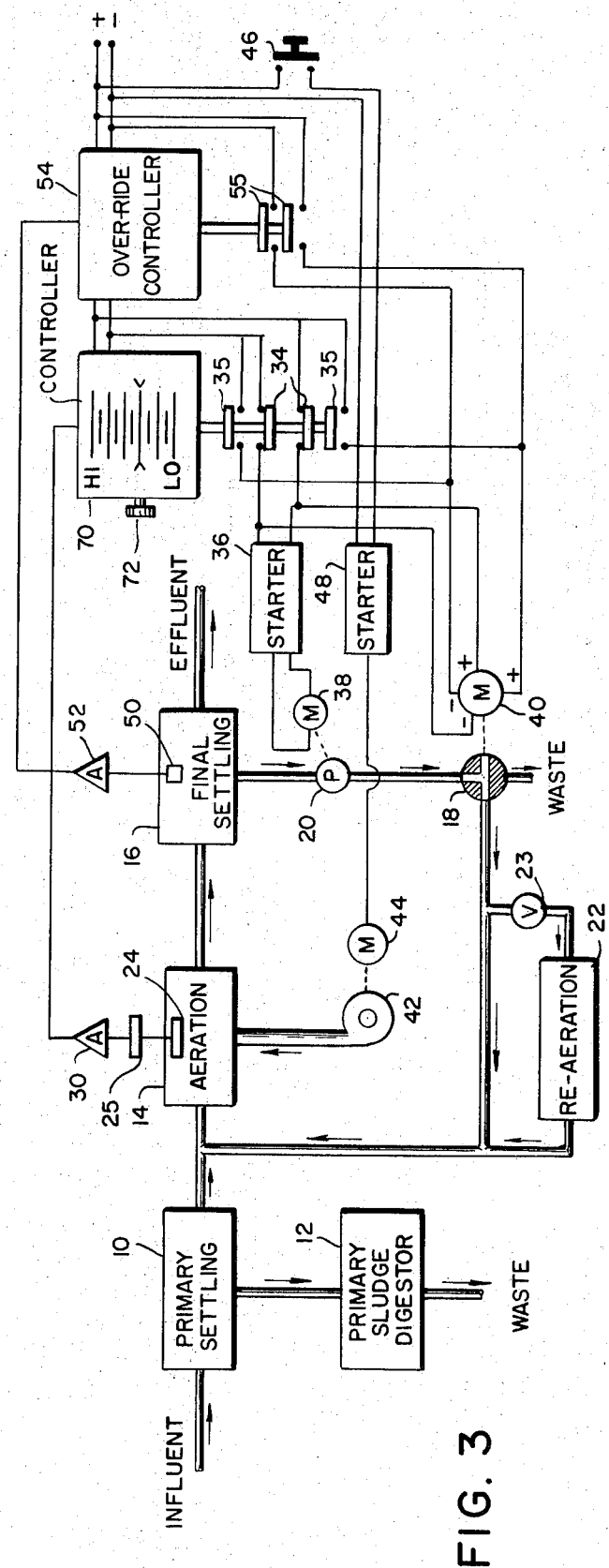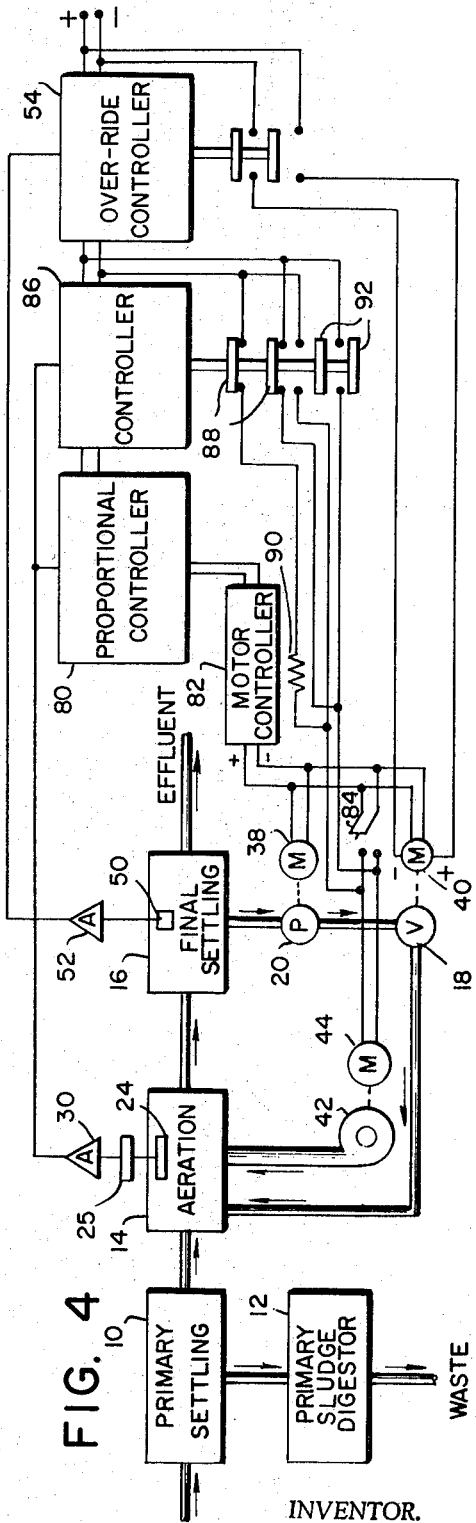
FIG. 3
FIG. 4
INVENTOR.
THOMAS A. ROSE
BY
James R. Campbell
ATTORNEY United States Patent Office 3,558,255
Patented Jan. 26, 1971

3,558,255
CONTROL SYSTEM FOR WASTE WATER
TREATMENT PLANTS
Thomas A. Rose, La Grange, Ill., assignor to Keene
Corporation, a corporation of Delaware
Filed Jan. 26, 1970, Ser. No. 5,765
Int. Cl. B01d 21/10
U.S. Cl. 210—96          22 Claims

ABSTRACT OF THE DISCLOSURE

A control system for a sewage plant having multiple tanks in which sewage is treated prior to discharging it to a receiving stream. A device in one tank detects and measures the concentration of suspended solids therein and provides an output signal representative of the amount of solids. System components respond to the signals and selectively control operation of a pump and valve in a line interconnecting two of the tanks for returning activated sludge at uniform or varying flow rates, from one tank to another to aid in the sewage decomposition process, and/or pumping the activated sludge to waste. The control components also control the delivery of air to the tank being treated. By utilizing a system of this type, the suspended solids concentration can be closely held within tolerable limits and thereby provide effluent of the desired quality to a receiving stream.

FIELD OF THE INVENTION

The invention described herein relates to waste water treatment systems and more particularly to apparatus and a method for controlling the operation and increasing the efficiency of waste water treatment systems for sewage and other solid containing liquids.

BACKGROUND OF THE INVENTION

Current interest by the public and Federal and State regulating agencies responsible for the health, safety and welfare of citizens, in the adverse effects flowing from air and water pollution has placed renewed emphasis on the need for greater control over polluted waters entering the country's lakes, streams and rivers. Reflection on the major sources of water contamination resulting from untreated domestic and industrial sewage entering the nation's streams shows that little if any procedures are utilized to automatically control the waste water treatment processes and operations. Because control systems are lacking, the efficiency of waste water treatment plants is almost entirely dependent on the skill and experience of plant operators.

It is evident that waste water treatment technology has not kept pace with advances in other technologies, primarily because of the lack of funds for research and development purposes. In particular, little or no progress has been made in the development of an effective automatic control system which would improve process optimization in the system. Optimizing conventional treatment processes would permit effective reduction of the size and cost of plants and the equipment required to treat a given volume of waste water.

In all waste water systems, the solids are in solution and suspension and include both organic and inorganic material. Heavy suspended solids can be separated out mechanically in the treatment process while the dissolved solids, such as iron and calcium in water, are low in organic matter and flow through the system for discharge to a stream. In carrying out waste water treatment operations, the primary objective is to stabilize the organic material, that is, to assure that the organic material has been broken down by bacterial action to simple substances which will decompose no further. The stabilization process is brought about by anaerobic and aerobic bacteria wherein the anaerobic bacteria is used to stabilize organic matter which has been removed from the sewage by sedimentation, this process being known as sludge digestion. Stabilization by aerobic bacteria in the activated sludge process is much more rapid but can be slowed or halted by decrease or interruption in the supply of free oxygen, with the result that a reversion to the anaerobic process takes place with consequent delay in processing waste water through the system. Other microorganisms, such as algae, protozoa and fungi, play important roles in decomposing many kinds of matters and materials in the treatment of sewage.

In the activated sludge process, the efficiency of the biochemical reaction in the aeration or mixed liquor tank, and consequently the efficiency of the total process, is dependent on many complex interrelated process variables. It has been demonstrated that temperature, retention time and concentration of suspended solids play a significant role in the biochemical reaction, and their interrelationships are known.

For a given temperature and retention period, there is an optimum suspended solids concentration. If the suspended solids concentration could be instantaneously and continuously measured and controlled, a basis would exist for automatically increasing the efficiency of the biochemical reaction in the mixed liquor tank, and hence, improving the quality of the final effluent.

According to conventional practices, one of the tests for total solids is made by evaporating a known amount of sewage and weighing the residue. Burning the residue and noting the loss in weight will give the volatile or organic solids and the fixed or inorganic matter. Samples are also filtered through asbestos paper, the moisture dried out and weighed to find the suspended solids. These are also burned to determine the organic and inorganic matters. By substraction of these results from the determination of total solids, the dissolved solids, both organic and inorganic, are found. The results of these laboratory tests are expressed in parts per million by weight or milligrams per liter, the solids being dry.

The purpose of the above discussion is to show the general background of waste water treatment operations and that elaborate, time-consuming tests must be carried out in the laboratory by plant operators to determine whether he sysem is operating at the desired efficiency. If not, the flows through certain tanks are adjusted in an attempt to achieve stabilization and discharge of the minimum parts of suspended solids per million in the final effluent. These steps taken by the operator in adjusting the systtm are based solely on experience and on analytical results which may be several hours or even days old. Since the hydraulic and biological load in the system varies during each day and from day to day, it is evident that the system could be operating inefficiently over long time periods without the operator's knowledge since the process control is dependent on the operator's experience. To overcome this disadvantage, current practices call for taking samples at frequent intervals and adjusting the system on the basis of the cumulative daily averages of the solid parts per million found. As a result, the system is never continuously in balance and may be radically out of balance in the interim between acquiring the analytical results from the samples taken. Also, adequate account is not taken of the peaks and low points of flow encountered in each day's operations.

The primary object of our invention therefore is to provide a new and unique automatic control system for optimizing the waste water treatment process.

Another object of our invention is the provision of a control system for improving the quality of effluent discharged from waste water treatment plants.

Another object of our invention is the provision of a control system for permitting the construction of plants of more compact design and reduced costs, and for increasing the effective capacity of existing plants without changing the present waste treatment components.

Still another object of our invention is the provision of a new process of automatically and simultaneously controlling the operation as well as the fluctuating biological conditions of waste water treatment plants.

Still another object of our invention is the provision of an improved control system for automatically adjusting components in a sewage system to discharge an effluent having solid particles within a desired prescribed range while the hydraulic and biological load in the plant influent is continuously varying.

BRIEF SUMMARY OF THE INVENTION

Briefly stated, in accordance with one aspect of my invention, I eliminate the need for plant operators to manually control sewage plant systems and to estimate the quantity and the time when activated sludge should be moved between tanks, by providing a control system which automatically detects and measures the suspended solids concentration in a tank and then delivers a signal representative of the amount of solids to control equipment. In responding to the signals, the control equipment operates a pump and opens and closes a valve, if one is provided, to control the movement of activated sludge from one tank to another. The equipment controls the amount of air furnished to the tank to satisfy biochemical oxygen demands while also diverting sludge to waste when a monitoring device detects the level of sludge in any tank with which the device is accociated. It will occur to those skilled in the art that any one or a multiple of events occurring in the plant processing system may be controlled in accordance with the teachings of the invention.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawing in which:

FIG. 3 is a modification of the control system shown in FIG. 1, and

FIG. 4 shows another modification of the control system shown in FIG. 1.

DETAILED DESCRIPTION

Figure 1:
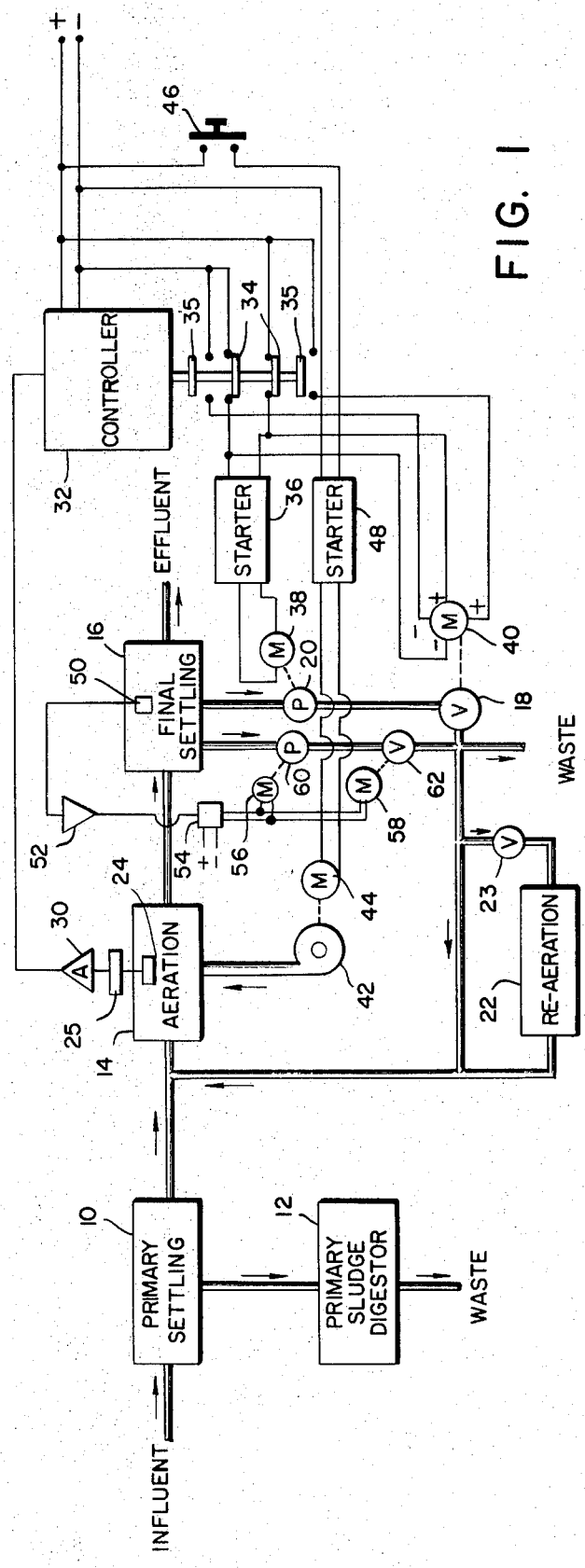
FIG. 1 is a diagrammatic showing of a waste water treatment plant including a system for controlling the movement of liquids and solids during plant operations.

Referring now to the drawings wherein like reference characters designate like or corresponding parts throughout the several views, the waste water treatment plant shown in FIG. 1 is of conventional design and many of the tanks and pumps used for obtaining refined operations have been eliminated to accommodate a showing of the control system. Although the system is designed for controlling the complete plant operations, regardless of the simplicity or complexity of plant size and performance requirements, the essential part of the invention relates to an automatic control system for optimizing the activated sludge process in the waste water treatment system.

Reference to the drawing will show that raw sewage influent is delivered to the plant where various designs of screens, comminutors, and the like, not shown, remove large items finding their way to the sewage plant from industrial areas, storm sewers and domestic sewage. Following screening and grinding, the sewage flows to a primary settling tank 10 where the velocity is slowed and heavy solids sink and separate out prior to delivery to a primary sludge digestor 12 wherein a reduction process takes place as a result of action by anaerobic bacteria.

The effluent from the primary settling tank 10 flows into an aeration or mixed liquor tank 14 in which major biochemical reactions in the plant take place. As is well known, if oxygen is supplied to sewage containing bacteria, the unstable organic material therein will decompose until the demand for oxygen is satisfied. The factors necessary for optimum biochemical reaction therefore include a satisfactory supply of oxygen, usually in the form of air, for a given bacteria population and a corresponding amount of organic suspended solids in any given size tank. The primary effluent which flows from the primary settling tank 10 into the aeration tank 14 is circulated within the tank to obtain a uniform mixing and dispersion of solids in the tank. Although the retention time in the aeration tank normally varies from 4 to 8 hours, varying treatment efficiencies result from varying retention times because the return sludge density and flow rate generally can not change rapidly enough to provide optimum treatment reaction conditions, as more fully described hereafter.

The effluent from the aeration tank flows to a final settling tank 16 where the velocity of sewage is again slowed or reduced so that the settable solids can settle out in the final settling tank. The effluent of the fianl settling tank comprises the plant product which is delivered to a receiving stream, river or other body of water.

The degree of treatment efficiency or the percentage of suspended solids which must be removed from the sewage is based on local, federal and state laws governing removal of suspended solids and reduction of BOD from the sewage received at the plant. Although water quality laws vary from place to place, generally accepted practice for secondary treatment plants permits 80% removal of suspended solids and 80% reduction of BOD and as these values are reached, the plant discharge effluent will not adversely pollute the water into which it is dumped.

Since activated sludge in final settling tank 16 is used for supplementing the organic suspended solids in aeration tank 14, or pumped to waste, such as a distant sludge drying bed if the sludge level in the tank rises to undesirable heights, a manually controlled diversion valve 18 customarily is employed for diverting the flow to the desired area.

As shown in FIG. 1, a pump 20 may be used for pumping such activated sludge from the final settling tank 16 to waste or to the aeration tank 14. The activated sludge may be diverted through a reaeration tank 22 if additional aeration is desired prior to delivery to the aeration or mixed liquor tank 14. In carrying out the activated sludge process in treating sewage, the biochemical reaction which takes place in the aeration tank constitutes the heart of the operation. It is dependent upon suitable agitation, oxygen, microbacterial population, organic suspended solids, and a multiplicity of other factors which must successfully interact for efficient plant operation. Also, the desired ratio of mixed liquor suspended solids, temperature, and retention time of primary sewage in an aeration tank have long been established for obtaining optimum plant performance. To measure suspended solids, laboratory techniques have been employed in the past requiring hand or manual sampling and evaporation weighing techniques, the results of which show the status of the plant at the time the sample was taken. After analysis, such results may be several hours old but they nevertheless are used and serve as the major criteria for adjusting the process, and such adjusting is performed on a manual basis. Should any of the above factors change substantially in the interval between testing, the biochemical reactions may likewise change radically without the operator's knowledge, the result being that the process will be extremely inefficient in removing suspended solids and reduction of BOD.

Figure 2:
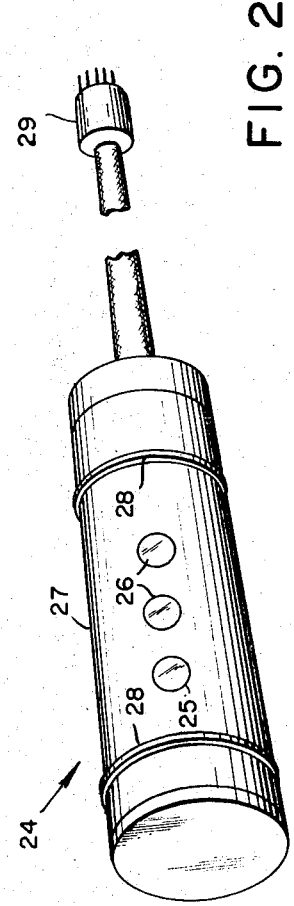
FIG. 2 is a perspective view of a suspended solids analyzer probe used in the control system.

To overcome these serious disadvantages in current plant operations, the automatic control system of this invention has been developed for continuously and instantaneously measuring and then controlling the sewage treatment process to secure optimum performance in the plant operations. An essential component in the system is a suspended solids analyzer. The instrument or suspended solids analyzer as referred to herein includes a probe 24 designed for immersion in the aeration tank 14. As shown in FIG. 2, the probe comprises a cylindrical casing equipped with a light source 25 and photocells 26 for detecting the amount of suspended solids in a liquid. To minimize deposition of light obstructing materials on the light bulb and photocells, a polyethylene sleeve 27 is shrunk on to the casing and over O-rings 28, thus forming a water-tight fit with the casing surface. An insulated cable having an electrical connection 29 serves to supply electrical power to and from the probe during system operation. The photocells respond to the light reflected from the aeration tank suspended solids and generates an output voltage which is converted by logarithmic ratio converter 25 to a linear voltage. This voltage is amplified by an indicating amplifier 30 equipped with a separate or integral power supply and signal shaping circuitry. The amplified signal is then delivered to an on-off type controller 32 which is chosen to have a range corresponding to the magnitude of electrical signals, which are representative of suspended solids content, expected to be received from probe 24 and amplifier 30.

Although the optimum amount of suspended solids to be maintained in the aeration tank 14 varies depending on biological load, temperature, retention time and the like, it has been found that suspended solids in parts per million by weight or milligrams per liter vary between 500 and 5,000 parts per million. The controller is chosen to have a range from 0 to 5,000 parts per million and may be set to operate within a range of 2,000 to 3,000 parts per million. When the signals supplied by amplifier 30 indicate the suspended solids are at say, the 2,000 level, the controller is activated to an ON position, and as the suspended solids rise and the signals increase in magnitude to the 3,000 level, the controller is changed to an OFF position, as more fully described hereafter. It will be aparent to those skilled in the art that many different types of commercially available controllers will perform this on-off function.

The controller includes a solenoid or relay, not shown, designed to have its coil energized when the signals approach the 2,000 level zone, and acts to move its armature and connected switch leafs to an up position. In so doing, switch 34 is closed, thus connecting the power source with starter 36 and its constant speed motor 38 which drives pump 20. Switch 34 also connects the power source with motor 40 or other power moving device to move valve 18, if one is used, to an open position. As this action occurs, the pump moves activated sludge from the final settling tank 16 to the aeration tank 14, either directly or through a re-aeration tank 22 controlled by manually operable valve 23 in the event additional air should be added to the return sludge. The motor 40 preferably is a linear motor designed to move valve 18 between open and closed positions, or it may be a more simple device, such as a solenoid, if the forces required to move the valve are of relatively low magnitude.

Since the aeration tank 14 desirably should be continuously supplied with air to aid the biochemical reaction taking place therein, a blower 42 controlled by motor 44 is connected to the tank in the usual manner to furnish the needed air. Power to the motor is supplied through a holding type or on-off push button switch 46 and motor starter 48.

In the operation of sewage systems, it is preferable to have a substantial reservoir for the activated sludge to permit having the maximum amount available when needed. To accomplish this, a sludge level probe 50 is positioned in the final settling tank 16 for controlling the maximum allowable level of sludge in the tank. The probe 50 utilizes a light source and photocells, the arrangement being such that when the sludge level is below the maximum height, light shines into the photocells and an electrical signal is transmitted to and amplified by amplifier 52 which holds in a relay in controller 54. However, as the sludge rises to the maximum height and covers the photocells, the signal is lost and the relay (not shown) in controller 54 drops out and closes contacts to supply voltage from the source indicated on the drawing to motors 56 and 58 respectively connected to operate pump 60 and open valve 62. The sludge level then drops as pump 60 moves activated sludge from the tank to waste, and when it uncovers the light source and photocells, a signal again is furnished through the amplifier 52 to the controller relay which pulls in and opens the motor circuit to stop the pump and move the valve to a closed position. By controlling the sludge level in this way, it is possible to obtain greater compaction of the sludge and help assure uniform return sludge density and the availability of a maximum amount for use in supplementing the supply in the aeration tank.

In operation, as the suspended solids analyzer probe 24 of FIG. 1, detects and measures the suspended solids in the aeration tank 14, the probe and converter 25 will deliver a DC output signal to the indicating amplifier 30 which will be a linear indication of the suspended solids in the tank. Assuming the suspended solids are at or near 2,000 parts per million, the signal furnished by the amplifier to the controller will cause a relay or solenoid in the controller to pull in its armature, thus closing switch 34 and energizing the starter 36 and its control motor 38. Simultaneously, the motor or solenoid 40 likewise will be energized thus opening valve 18 to establish communication between the final settling tank 16 and the aeration tank 14. Sewage thereupon will be pumped by pump 20 from the final settling to the aeration tank and since the sewage therein is continually agitated within the tank, the probe 24 will detect the change in suspended solids content and accordingly will supply a signal through amplifier 30 to the controller which will reflect the increase in suspended solids. As the amount thereof rises to 3,000 parts per million, the solenoid in the controller will be de-energized, the switch 34 will open as the armature drops, and switch 35 thereupon will close thus de-energizing the circuit to the pump motor 38 to cause the pump to stop and reversing the polarity of motor 40 to cause the motor to close valve 18. This process will be repeated throughout the system operation and is effective in controlling the suspended solids content between 2,000 and 3,000 parts per million by weight, with the average being 2,500 parts per million by weight. As previously indicated, the blower 42 will constantly furnish air to tank 14 although motor 44 operation can be manually controlled by a switch 46 and if necessary, by the associated motor starter 48.

Should the level of suspended solids in the final settling tank 16 rise to the predetermined maximum height as previously described, the sludge level probe 50 will become inactive and the signal to controller 54 therefore will be lost. As a result, a relay in controller 54 will be energized thus causing motors 56 and 58 to respectively place the pump 60 in operation and open valve 62 to permit the pump to reduce the level of suspended solids in the tank. As the level drops to a point where the light source and photocells in the indicator 50 are uncovered and thereby are capable of again transmitting a signal through amplifier 52 to the controller 54, the relay in the controller will be energized thus opening the circuit to the motors 56 and 58 and stopping operation of the sludge removal process and simultaneously closing the valve 62 in the line connecting the final settling tank to waste, such as sludge drying beds.

Referring now to the modification of FIG. 3, it will be seen that the primary settling, aeration and final settling tank disposition with respect to one another are the same as previously described, along with the arrangement for obtaining the transfer of sewage from the final settling tank to the aeration tank. Likewise, the suspended solids analyzer probe 24 and the means for obtaining amplification of the probe signal which indicates suspended solids in the aeration tank, and basically, the control means for energizing the pump 20 and operating valve 18, are essentially the same. The difference, however, resides in the type of controller used along with the use of a three-way valve which is designed to permit the circulation of the sewage from the final settling tank to the aeration tank, from the final settling tank to waste or the combination of circulating to the aeration tank and to waste.

Referring more specifically to FIG. 3, the amplified signal from suspended solids analyzer probe 24 is delivered to a recorder-controller 70 which is calibrated in parts of suspended solids per million by weight or in milligrams per liter. The recorder-controller has a relatively wide range as between 500–5,000 parts per million by weight or milligrams per liter with high and low alarm settings along with a manually adjusted reference set-point 72. The reference set-point 72 will indicate the desired amount of suspended solids to be maintained in aeration tank 14 and will maintain control of suspended solids within a relatively narrow band of ±5% of the optimum amount of solids to be maintained in the tank.

A number of two mode electronic analog controllers are commercially available and suitable for this purpose, such as Model #257–10 made by BIF, a division of General Signal Corporation. The recorder-controller 70, probe 24 and indicating amplifier 30 are chosen to match each other, with the components having a range to continuously and instantaneously measure and record the aforementioned 500–5,000 parts of suspended solids in aeration tank 14. The recorder-controller further is manually adjustable by the plant operator to permit selecting the reference set-point 72 which will be indicative of the amount of suspended solids desired to be maintained in the tank. If a reference set point of 2,500 parts per million by weight of suspended solids represents and is selected as an optimum amount based on temperature and the retention time that such solids are kept in the tank, the reference is set manually by knob 72 on the recorder-controller. Since a range of ±5% on either side of the 2,500 reference is acceptable, the controller is designed to maintain suspended solids in this range and it therefore constitutes the control zone.

In the example chosen, the control zone may extend 125 parts per million on either side of the reference set-point. An on-off type of controller is incorporated in the recorder-controller 70 which is energized when the signals from indicating amplifier 30 are of a value indicating the suspended solids content in aeration tank 14 is less than 2,375 parts per million by weight. When energizer, it causes switch 34 to close, thus completing the circuit and applying line voltage to motor starter 36 controlling the constant speed pump motor 38, and linear valve motor 40. As shown, when the linear motor moves valve 18 to a position connecting the final settling tank 16 with aeration tank 14, and the constant speed pump motor is energized, the pump 20 will circulate activated sludge from the final settling to the aeration tank. The blower 42 will supply air to accelerate the biochemical process taking place therein in the manner previously described. It is apparent variable speed drives may be used for the pump and blower depending on whether it is desirable to vary the activated sludge and air flow to aeration tank 14. The valve 18 is a simple three-way valve positioned in the piping (a) to connect the final settling tank with the aeration tank for circulating the activated sludge between the tanks, (b) to connect the final settling tank only to sludge drying beds, and (c) to connect the final settling tank to both the aeration tank and sludge drying beds. Since the valve performs these three functions, any conventional means besides a linear motor may be used in rotating it to a position demanded by the recorder-controller.

In operation, the suspended solids analyzer probe 24 continuously detects and measures the suspended solids in the aeration tank 14, and simultaneously delivers a DC output signal to the logrithmic ratio converter 25 and indicating amplifier 30. The indicating amplifier will transmit a signal to the recorder, whose pen position will duplicate the indicating needle on the indicating amplifier. If the indicated reading and the recording pen are both below the neutral area and in the low alarm zone, thus indicating the suspended solids are below the optimum value, the recorder-controller 70 will energibe its relay and close switch 34 and the circuit to the motor starter 36 and motor 40. The valve 18 is thereupon rotated to connect the final settling tank with the aeration tank and the pump 20 commences to circulate the activated sludge to the aeration tank. Simultaneously, motor 44 will place blower 42 in operation to furnish air to the aeration tank. Since sewage in the aeration tank is continually agitated and circulated within the tank, the probe 24 will continually detect changes in the suspended solids and simultaneously furnish an output signal to the indicating amplifier 30 reflecting the changing conditions in the manner previously described. Since the pen on the recorder-controller 70 moves linearly with the increase in suspended solids concentration in the aeration tank, it gradually will move upscale and de-energize the relay, thus dropping its armature and opening switch 34 and its associated circuit including motor starter 36. At this time, switch 35 closes, reversing the polarity of motor 40 and the valve is moved to a closed position. The motor rotor is now in a position to re-open valve 18 when the operation is repeated.

As the biochemical reaction continues in the aeration tank, the suspended solids analyzer probe will continue to monitor and detect changes in the suspended solids in the aeration tank and accordingly provide output signals to the indicating amplifier and the recorder-controller to repeat the above-described process to return the system to the balanced condition of about 2,500 parts per million by weight of suspended solids in the aeration tank.

In the modification illustrated in FIG. 1, the level of sludge in the final settling tank was controlled by a sludge probe 50, controller 54, motor 58 and waste valve 62 so that as the sludge level rose to the present elevation and the sludge blanket shut off light energy emanating from the light source, the sludge level controller makes the valve operative to permit pumping the sludge to waste. The arrangement described in FIG. 3 however utilizes a single valve for pumping the activated sludge to different places. As shown, the sludge probe 50, amplifier 52 and controller 54, here designed as an over-ride controller for reasons explained later, are the same as FIG. 1. The relay or solenoid incorporated in the controller 54 controls the circuit to motor 40 through switches 55. Should the sludge level rise above its optimum level, the controller closes switches 55 and motor 40 rotates the valve to the waste position.

In the normal course of system operation, the sludge level will not rise above the optimum sludge elevation in the final settling tank when pump 20 is circulating activated return sludge to the aeration tank. However should the unlikely event arise wherein this does occur, the sludge probe 50 will energize controller 54 as before. Under this condition, the waste valve is in a position connecting the final settling tank with the aeration tank. To continue returning sludge to the aeration tank and simultaneously pump the sludge to waste drying beds, the voltage applied through switches 55 to the windings of linear motor 40 will be additive and motor 40 will therefore over-ride the pre-set valve position and rotate the valve 18 to a position to permit pump 20 to simultaneously pump activated sludge to the aeration tank and to waste. As the level drops in final settling tank, the switches 55 will open and the valve will then be rotated to the final settling tank-aeration tank flow circuit.

In some installations, it is advantageous to pump activated sludge to the aeration tank in proportion to the degree of suspended solids undergoing chemical action therein.

The modification of FIG. 4 includes an arrangement for obtaining delivery of activated sludge to the aeration tank in proportion to the amount of suspended solids existing in the tank. The system components are the same as in the previous modifications except that a narrow band proportional plus reset controller 80 and a motor controller 82 are used for controlling the movement of sludge between the tanks.

The proportional plus reset controller may be Model No. 257–11 manufactured by BIF, a division of General Signal Company or any other commercially available device capable of converting the output signal from amplifier 30 to a controller output proportional to the direction and degree of deviation from the set point to operate motor controller 82 controlling the operation of valve 18 and pump 20. The controller further includes a process set point wherein the controller output signal is proportional to the degree and direction of offset of the recording pen to the set point. It desirably should have narrow proportional band and automatic reset (two mode) control, although individual system process lags and time constant may dictate changed controller action. The motor 38 controlling pump 20 is a variable speed motor while motor 40 preferably is equipped with limit switches designed to open and close valve 18 when voltage is applied to the motor windings.

Also, the motor controller 82 may be adapted to control the operation of blower motor 44 to provide for the delivery of air to the aeration tank in an amount directly proportional to the quantity of sludge which simultaneously is being supplied to the tank.

The need for different amounts of oxygen exists at different times, although air is continuously supplied to the system as discussed above in relation to FIGS. 1 and 3. However in some instances greater amounts of oxygen must be furnished to satisfy the biochemical oxygen demand. This condition occurs when the aeration tank suspended solids content is low and the suspended solids analyzer probe and associated circuitry call for the return of activated sludge, thereby requiring an increased demand for oxygen. Still further, in some situations the suspended solids content in the effluent being delivered to a stream may be sufficiently high to require highest output from the blowers to reduce it to reasonable levels.

The present control system is designed to accommodate these varying requirements for oxygen in the system.

As shown, the blower motor 44 is energized when controller 80 is furnishing an output voltage according to the suspended solids concentration requirements in tank 14. Should plant conditions indicate that air at other flow rates should be supplied to the tank, motor 44 can be removed from the motor controller circuit by opening switch 84. If at that time, the signal furnished by suspended solids probe 24 indicates the suspended solids is less than 2,500 parts per million, controller 86 will close switch 88, thus applying line voltage to the motor 44 through resistor 90 and the blower will operate at a predetermined speed. As the solids content rises beyond 2,500 parts per million, the controller 86 opens switch 88 and closes switch 92 to cause blower operation at a higher speed. Obviously, the blower motor can be controlled by components other than the controller-switch-resistor arrangement shown.

As suspended solids probe 24 detects and measures the amount of suspended solids in tank 14, the output signal is amplified and transmitted to the proportional plus reset controller 80. The controller provides a controlled output signal proportional to the signal from amplifier 30 and sufficient to position the control elements of the motor controller. The motor controller thus controls the speed of motor 38 and movement of motor 40 armature in a manner such that if the signal from suspended solids probe 24 indicates that the suspended solids content in tank 14 is slightly below the optimum amount, and as shown by the degree of offset of the pen from its set point, the lower value signal transmitted is converted by the proportional controller to a controlled signal output proportional to process-to-set point offset, and of a magnitude to cause motor 38 to operate at a slow speed and motor 40 to open valve 18. The flow rate of pump 20 therefore will be low, the valve will be open and a relatively small amount of activated sludge will be returned to tank 14. Conversely, should the probe signal be relatively large indicating a low value of suspended solids in the tank, the motor 38 and pump 20 will be operated at a higher speed to return a large amount of suspended solids through a wide open valve to tank 14. This action will continue with the pump returning varying amounts of sludge to tank 14 depending on the amount of suspended solids in the tank as detected and measured by suspended solids probe 24.

Further, as the suspended solids probe 24 measures and detects an upward change in the suspended solids content, the controller will increase the voltage supplied to the blower motor and it gradually will increase speed and therefore increase the flow rate and volume of air being supplied to the aeration tank. As the demand for suspended solids is satisfied, as indicated by the suspended solids probe and controller, the motor-controller circuit will be de-energized, but controller 86 will keep the blower operating at a high output. During the time the blower is operating, activated sludge from the final settling tank may or may not be undergoing transfer to the aeration tank. It will be apparent that the circuit controlling the valves and motor which move the sludge to the aeration tank may also control the blower motor 44, but to do so, will require the making of appropriate circuit connections and duplicating components in the controller, to obtain high blower speed when the suspended solids concentration is high and vice versa.

It will be apparent to those skilled in the art that utilization of the system described above permits direct measuring of the suspended solids on a continuous basis and since determination of the magnitude of suspended solids content is instantaneously made, the control system is capable of effectively controlling the system to assure that the amount of suspended solids in the tank is held at an optimum level.

Although the circuit components in the foregoing description are identified as relays, solenoids and the like, it will be apparent that other conventional and commercially available devices may be employed for performing the same function. Also the valve and circuit arrangement described and shown in FIGS. 1, 3 and 4 utilize single or multiple-way waste sludge diversion valves but it will be understood that either one or the other, or both, may be employed to assist in lowering the level of sludge in the final settling tank. The concept is one of controlling the sludge height by utilizing a device which senses the level and the use of one or two valves will primarily be dependent on the particular design of sewage plant in which the installation is made.

The maximum elevation of the sludge blanket must be determined for each individual plant with varying tank sizes, flow rates, suspended solids concentration, age of the suspended solids in the sludge, and the like. It is obvious that selection of different size circuit components will be necessary to obtain appropriate system performance. If the process demands for the return sludge are small and the sludge blanket ages in the final settling tank, anaerobic bacteria conditions can be established to the detriment of the process. By utilizing the sludge level probe and its associated control system, the likelihood of such adverse conditions taking place are remote since the activated sludge blanket can be maintained in the final settling tank at a predetermined height (elevation) to prevent undue sludge aging. Nevertheless, for emergency purposes, the circuit should be connected to handle unusual conditions and to override the control system and vary the sludge level if requirements exist to do so.

Under certain other conditions of operation, the quality of the effluent pumped from the final settling tank to a receiving stream may exceed a permissable amount of about 5% of plant influent of suspended solids. To detect these suspended solids, the suspended solids probe 24 will or can be located in the final settling tank. Under these circumstances, a proper balance of activated sludge and oxygen must be furnished to the system to decrease the suspended solids in the aeration and therefore the final settling tank. To accommodate such conditions, the over-riding features of the control system provide that if the probe located in the final settling tank senses excessive concentrations of suspended solids; the control system will over-ride all other controls to obtain decrease in the suspended solids at the maximum rate. This is accomplished by having the indicating amplifier 30 provide a signal to the controller 80, as in FIG. 4. When this occurs, the sludge pump motor 40 is operated at its highest speed to return activated sludge from the final settling tank to the aeration tank at the maximum flow rate. Simultaneously, the controller 86 causes blower motor 44 to operate at high speed to provide air, and therefore, oxygen to the tank at the maximum flow rate. As these maximum flow rates occur, the biochemical reaction will take place at an accelerated rate.

As time progresses, the probe will sense changes in the concentration of suspended solids in the discharge effluent and as the concentration changes to the desired values, the circuits are de-energized and the system reverts to normal operation, i.e. the return sludge pump is turned off, the waste diversion is closed, and the blower motor is caused to run at low speed.

By operating the system to control the suspended solids concentration in the aeration tank to within ±5% of optimum suspended solids concentration on a continuous 24-hour day seven day a week basis, the quality of the final effluent will reflect 95% removal of suspended solids and reduction of BOD. In addition, the improvement in plant efficiency will permit substantial increase in volume of sewage which can be handled by the plant, without degradation of the effluent quality through reduction in aeration detention time.

In view of the above, it will be apparent to those skilled in the art that many modifications and variations of the herein disclosed example of the invention are possible in light of the above teachings. It therefore is to be understood that within the scope of the appended claims, the invention may be practiced other than as specifically described.

What I claim as new and desire to secure by United States Letters Patent is:

1. A control system for a waste water treatment plant comprising:

a multiplicity of sewage treatment tanks including at least primary settling, aeration and final settling tanks connected and arranged so that influent sewage from a source is supplied to the primary settling tank and subsequently treated in said tanks prior to discharging effluent from the final settling tank to a receiving stream and the sewage solid matter to sludge drying beds, a pump in a feed-back lineinterconnecting at least two of said tanks for selectively supplying activated sludge from at least one of said tanks to the other of said tanks for facilitating the biochemical stabilizing process therein, sensing means associated with one of said tanks for detecting and measuring the concentration of suspended solids in sewage contained therein, said sensing means being capable of generating an output reflecting the existence of suspended solids in said tank, control means connected with the sensing means and responsive to the output therefrom, said control means being connected with the pump for controlling the operation thereof in response to the output delivered to said control means by said sensing means, whereby said pump operates under the influence of said control means for effecting the movement of sludge from one of said tanks to the other of said tanks.

2. A control system for a waste water treatment plant comprising:

a multiplicity of sewage treatment tanks including at least primary settling, aeration and final settling tanks connected and arranged so that influent sewage from a source is supplied to the primary settling tank and subsequently treated in said tanks prior to discharging effluent from the final settling tank to a receiving stream and the sewage solid matter to sludge drying beds, a pump in a feed-back line interconnecting at least two of said tanks for selectively supplying activated sludge from at least one of said tanks to the other of said tanks for facilitating the biochemical stabilizing process therein, a device associated with one of said tanks for detecting and measuring the concentration of suspended solids in sewage contained therein, said device being capable of generating an output reflecting the existence of suspended solids in said tank, conversion means connected with said device for converting said output to a signal directly proportional to suspended solids concentration, and for amplifying said signal, control means connected with the device and responsive to the output therefrom, said control means being further connected with the pump for controlling the operation thereof in response to the output delivered to said control means by said conversion means, whereby said pump operates under the influence of said control means for effecting the movement of sludge from one of said tanks to the other of said tanks.

3. The combination according to claim 2 wherein a valve is connected in said feed-back line, and means connecting said valve with said control means, whereby said control means controls the valve between open and closed positions and controls the operation of said pump for effecting the movement of activated sludge from one of the tanks to the other of said tanks.

4. The combination according to claim 2 wherein said control means includes actuating means connected with said valve and said pump for causing operation thereof in accordance with the response of said control means to signals received thereby from said device.

5. A control system for a waste water treatment plant comprising:

a multiplicity of sewage treatment tanks including at least primary settling, aeration and final settling tanks serially connected and arranged so that influent sewage from a source is supplied to said primary settling tank and subsequently treated in said tanks prior to discharging effluent from said final settling tank to a receiving stream and discharging the sewage solid matter to sludge drying beds, a valve and a pump in a feed-back line interconnecting said final settling tank with said aeration tank for returning activated sludge from the final settling tank to said aeration tank for facilitating the decomposition process therein, a device in said aeration tank for continuously and instantaneously detecting and measuring the amount of suspended solids in sewage contained therein, said device being capable of generating an output signal reflecting the existence of suspended solids in said tank, conversion means connected with said device for converting said output to a signal directly proportional to suspended solids concentration, and for amplifying said signal, control means connected with said conversion means and responsive to said signals generated therein, actuating means connected with said valve and said pump for controlling the operation thereof, said control means being connected with said actuating means for controlling the position of said valve and the operation of said pump in accordance with said signals delivered to said control means by said conversion means, whereby when said control means responds to said signals, the control means causes said actuating means to operate said valve and pump to circulate activated sludge to said aeration tank, and as said signals increase indicating the suspended solids content has increased to an optimum amount, said control means causes said actuating means to operate said valve and pump to shut off the activated sludge supply to said aeration tank.

6. The combination according to claim 5 wherein said valve is a multiple position valve and said control means is arranged to control said valve actuating means to deliver sludge selectively to said aeration tank or said drying beds or simultaneously to both said aeration tank and said drying beds.

7. The combination according to claim 5 wherein said device detects and measures the amount of suspended solids and simultaneously and continuously furnishes signals representative of said amount to said control means.

8. The combination according to claim 5 wherein said control means comprises a controller having high and low settings which corresponds with the maximum and minimum amounts respectively of suspended solids desired to be maintained in said aeration tank.

9. The combination according to claim 5 wherein said controller comprises a controller-recorder having high and low settings, a recording pen responsive to the signals received from said conversion means and mounted in a manner such that as said signals vary in accordance with the suspended solids content in the aeration tank, the pen moves between said high and low settings as the suspended solids content ranges respectively between high and low amounts.

10. The combination according to claim 5 wherein said control means has incorporated therein a manually settable reference representative of the optimum amount of suspended solids desired to be maintained in said aeration tank, said control means further having a predetermined range on each side of said reference over which it controls the operation of said valve and pump so that when said signals are of a magnitude above said reference, the actuating means opens said valve and places the pump in operation, and closes the valve and stops the pump when the signals are of a magnitude below said reference.

11. The combination according to claim 5 wherein said actuating means is connected with a blower for controlling the operation thereof, an air intake to said blower and pipes connecting the discharge therefrom with said aeration tank.

12. The combination according to claim 9 wherein said control means is connected to said actuating means for causing operation of the blower at a speed directly proportional to the magnitude of said signals.

13. The combination according to claim 5 wherein a sludge level indicator is positioned in at least one of said tanks for sensing the level of sludge therein, means in said indicator producing an output signal when the sludge is below the level of said indicator, second control means connected with said indicator and with said actuating means controlling the multiple position valve, whereby when the sludge level in said tank rises above said indicator, the latter stops furnishing a signal to said second control means which causes the actuating means to move the valve to a waste position thereby connecting the tank with sludge drying beds and lowering the level of sludge in said tank.

14. The combination according to claim 5 wherein said control means controls said actuating means in accordance with the amount of suspended solids detected by said device in said tank to thereby return activated sludge to said aeration tank at a rate corresponding to the concentration of said suspended solids therein.

15. A control system for a waste water treatment plant comprising:

a primary settling tank for receiving influent from a source of supply, and a primary sludge digestor tank connected with said primary settling tank for disposing of the settled solids accumulating therein, an aeration tank connected with said primary settling tank for receiving sewage effluent therefrom and wherein said aeration tank contains bacteria for decomposing organic matter in the sewage prior to delivering effluent to a final settling tank, said final settling tank having a first discharge line for delivering effluent to a receiving stream, and a second discharge line having a valve and a pump therein for selectively delivering activated sludge from the final settling tank to sludge drying beds or to the aeration tank for accelerating the decomposition process taking place therein, a device in said aeration tank for continuously detecting and measuring the amount of suspended solids therein and being capable of simultaneously generating output signals representative of the amount of suspended solids, conversion means connected with said device for converting said output to a signal directly proportional to suspended solids concentration, an amplifier connected with the conversion means in said aeration tank for amplifying said signals, a controller connected with said amplifier for receiving the amplified signals therefrom, means in said controller permitting the establishment of a reference corresponding to the concentration of suspended solids concentration desired to be maintained in said tank, said reference including a neutral zone of about 1%–5% of the desired solids concentration on either side of said reference, means in said controller establishing high and low settings on opposite sides of said neutral zone, switching means in said controller responsive to the signals received from the amplifier for opening and closing a circuit connected with a source of voltage supply, control components in said circuit respectively connected with said valve and said pump for adjusting the position of said valve and controlling the operation of said pump, whereby as the device in said tank furnishes signals through said conversion means and amplifier to the controller which are below said neutral zone, the controller causes operation of the switching means to provide a source of voltage to said control components to move said valve to an open position and thereby establish communication between the final settling tank and the aeration tank, and to operate the pump and thereby move the activated sludge from the final settling tank to the aeration tank, and as signals from said device in the aeration tank move into the neutral zone, the controller opens said switching means and de-energizes the devices operating said valve and said pump.

16. The combination according to claim 15 wherein the device in said tank comprises a probe utilizing a light source and photocells for determining the suspended solids concentration in said tank.

17. The combination according to claim 15 wherein said switching means in said controller provides an output proportional to the signals received from the device in said tank, and,
   wherein said control components are proportional devices capable of controlling said valve and said pump in incremental amounts to thereby achieve activated sludge flow between said tanks in an amount that corresponds with the output signals.

18. The combination according to claim 15 wherein said switching means is designed to activate a motor-operated blower,
   means connecting the blower with said aeration tank for furnishing a supply of air thereto when the blower is in operation.

19. The combination according to claim 18 wherein said controller has included therein an over-ride zone appearing above the high level zone established in the controller the arrangement being such that in the event signals from said amplifier fall into the range provided by the override controller, the controller actuates said switching means and to cause said pump and blower to operate at a maximum speed and thereby provide a maximum flow of sewage from the final settling tank and air to the aeration tank for causing the decomposition process to take place at its maximum rate.

20. The combination according to claim 15 wherein said controller is a proportional controller and is designed to have an output directly corresponding to the magnitude of signals received from said indicating amplifier,
   means connecting said proportional controller to said control components controlling said pump, valve and blower.
   each of said control components being designed to operate at a variable speed corresponding to the voltage supplied by said proportional controller,
   whereby said pump and blower are designed to operate at a speed directly corresponding with the magnitude of signals furnished to the proportional controller by said indicating amplifier.

21. The combination according to claim 15 wherein a sludge level indicator is positioned in said final settling tank,
   said indicator being designed to furnish an output signal when the level of sludge in said settling tank is below a predetermined maximum height and as said sludge level rises to said predetermined height, the indicator no longer furnishes an output signal,
   means connecting said indicator with an indicating amplifier and said control means,
   means in said controller designed to remain in an energized condition so long as signals are received therefrom from said indicator and amplifier,
   switching means in said controller designed to open and close a circuit furnished with a source of voltage supply, said control components controlling said selector valve position in said circuit,
   whereby when the sludge in said final settling tank rises above said predetermined level, the signal normally furnished to said amplifier by the indicator is lost and the switching means in said controller is de-energized, thereby causing the circuit to the control component controlling said multiple-position valve to move the valve to a position for establishing communication between the final settling tank and sludge drying beds for lowering the sludge level in said final settling tank.

22. The combination according to claim 21 wherein pipes establishing a by-pass connection from said final settling tank to said drying beds are inserted across said multiple-position valve,
   a motor operated valve and pump in said by-pass circuit which are made operative by said indicator and controller when the circuit is energized, when the sludge level rises above said indicator,
   thereby causing said pump to rotate and said valve to move to a position to lower the level of sludge in the final settling tank.

References Cited
UNITED STATES PATENTS

| | | | |
|---|---|---|---|
| 2,661,332 | 12/1953 | Mortenson | 210—96X |
| 3,281,594 | 10/1966 | Garrison | 210—96X |
| 3,476,682 | 11/1969 | Albersmeyer | 210—197X |
| 3,504,795 | 4/1970 | Johnson | 210—101X |

JOHN ADEE, Primary Examiner

U.S. Cl. X.R.

210—101, 112, 197